Dec. 2, 1952
G. W. HAYES ET AL
2,619,662
AUTOMATIC COIN-CONTROLLED BALL-CLEANING
AND POLISHING APPARATUS
Filed Feb. 20, 1948
8 Sheets-Sheet 3
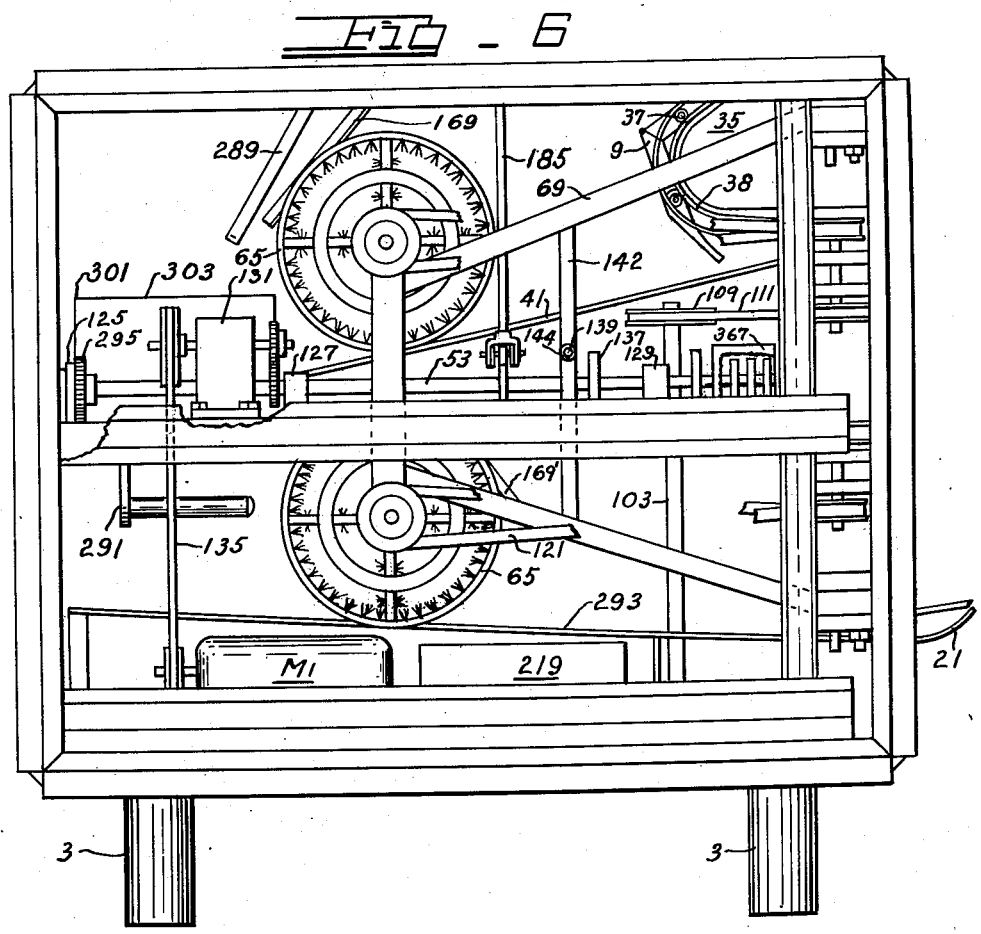
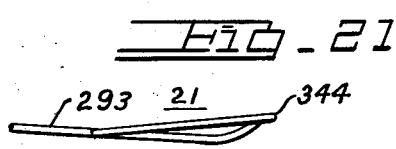
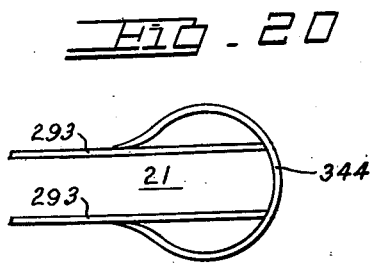
INVENTORS.
GEORGE W. HAYES
OTTO SLOAN
BY F.D.Hicks
ATTORNEY

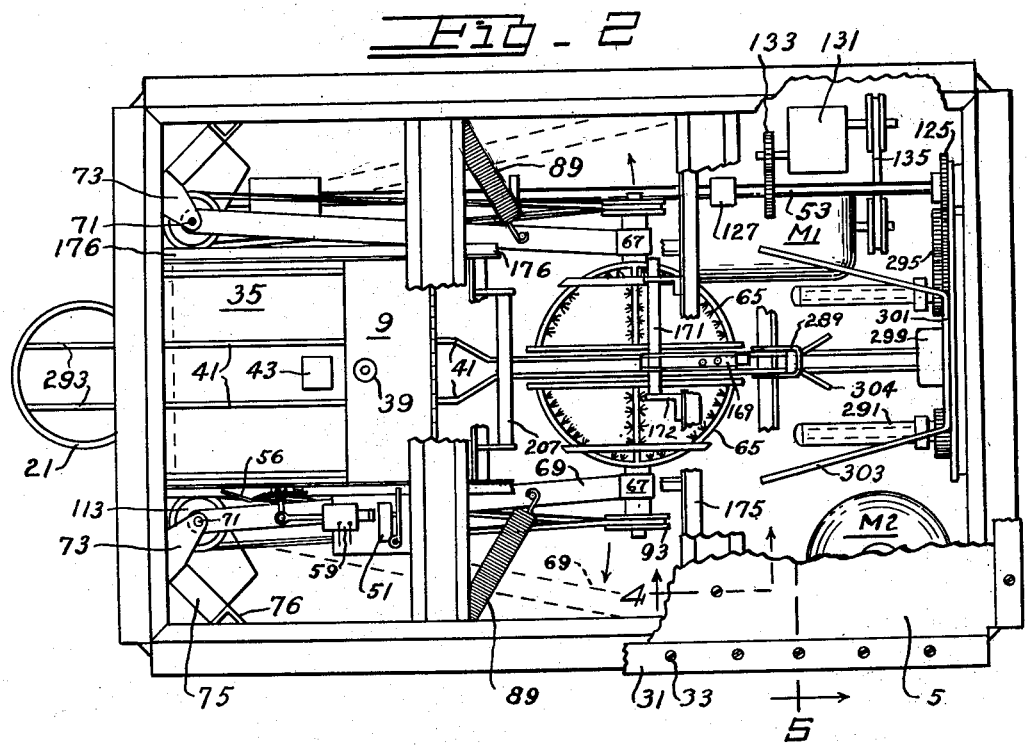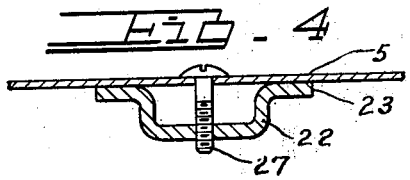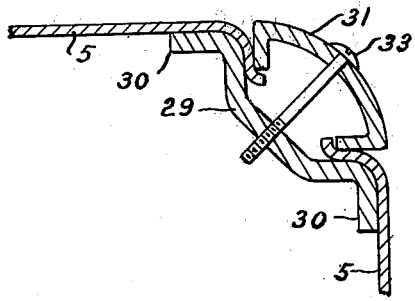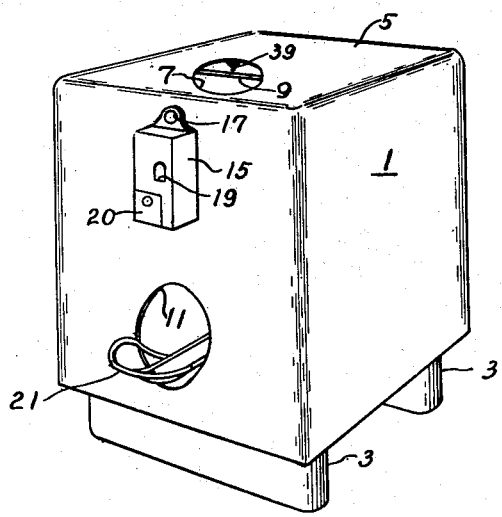

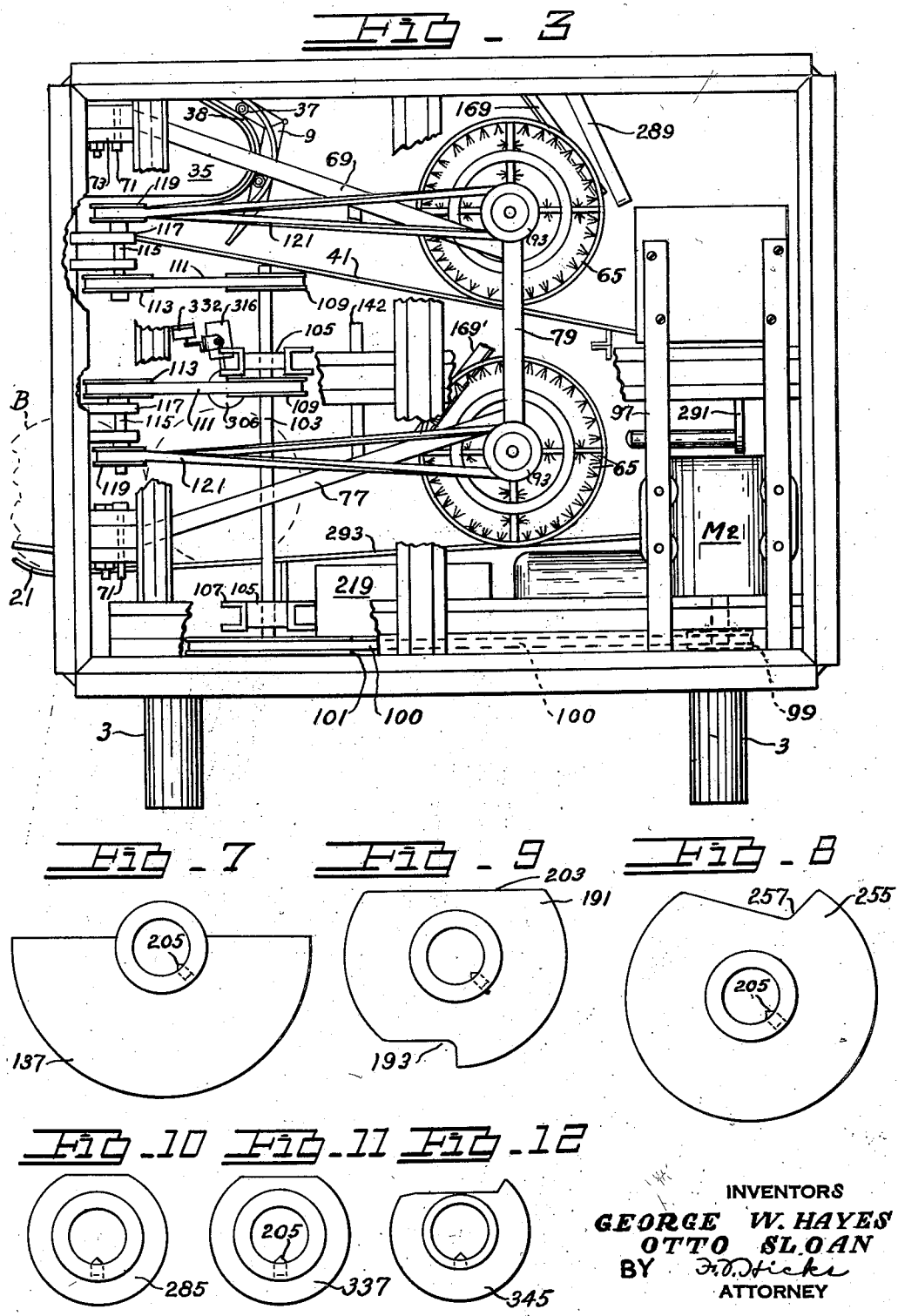

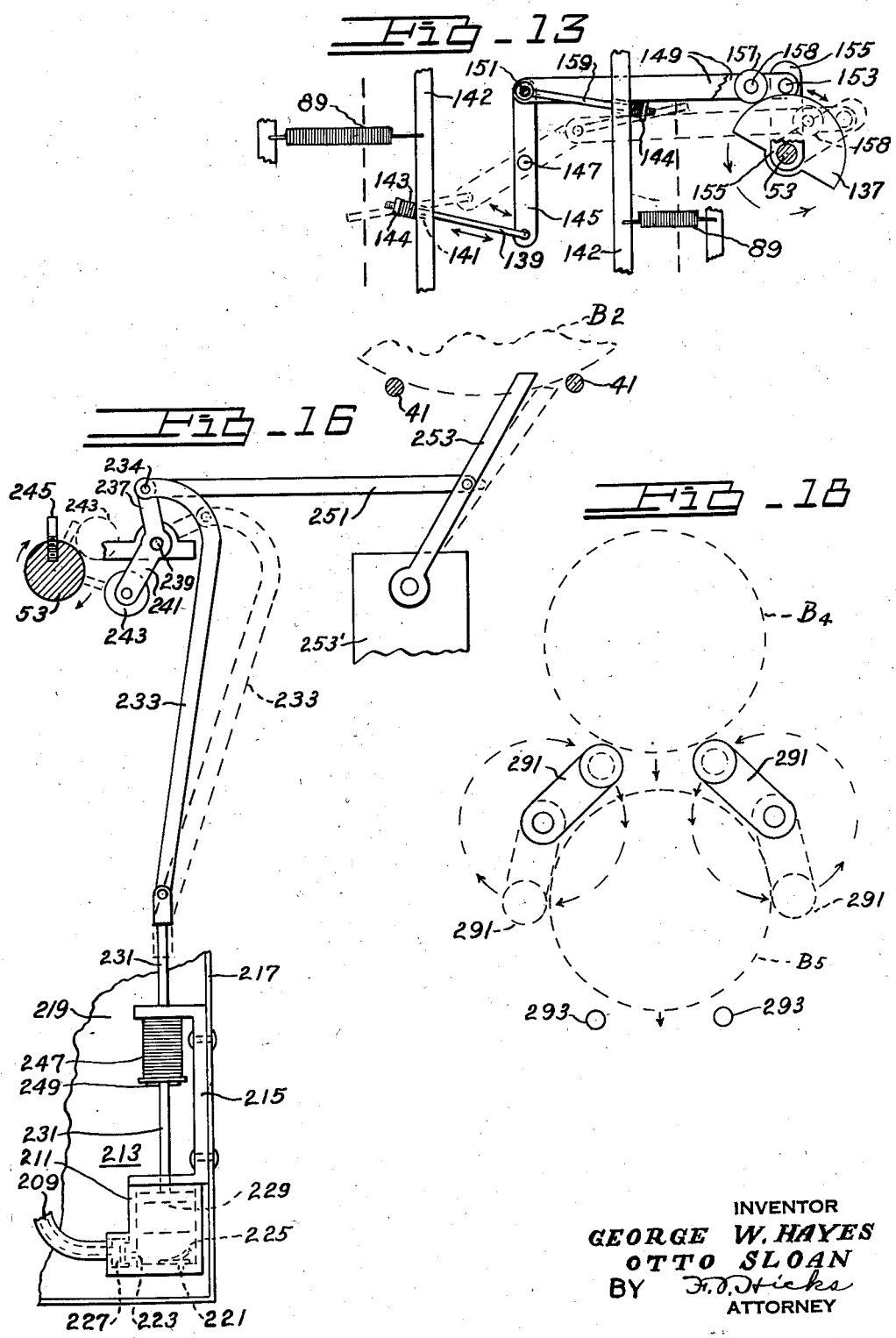

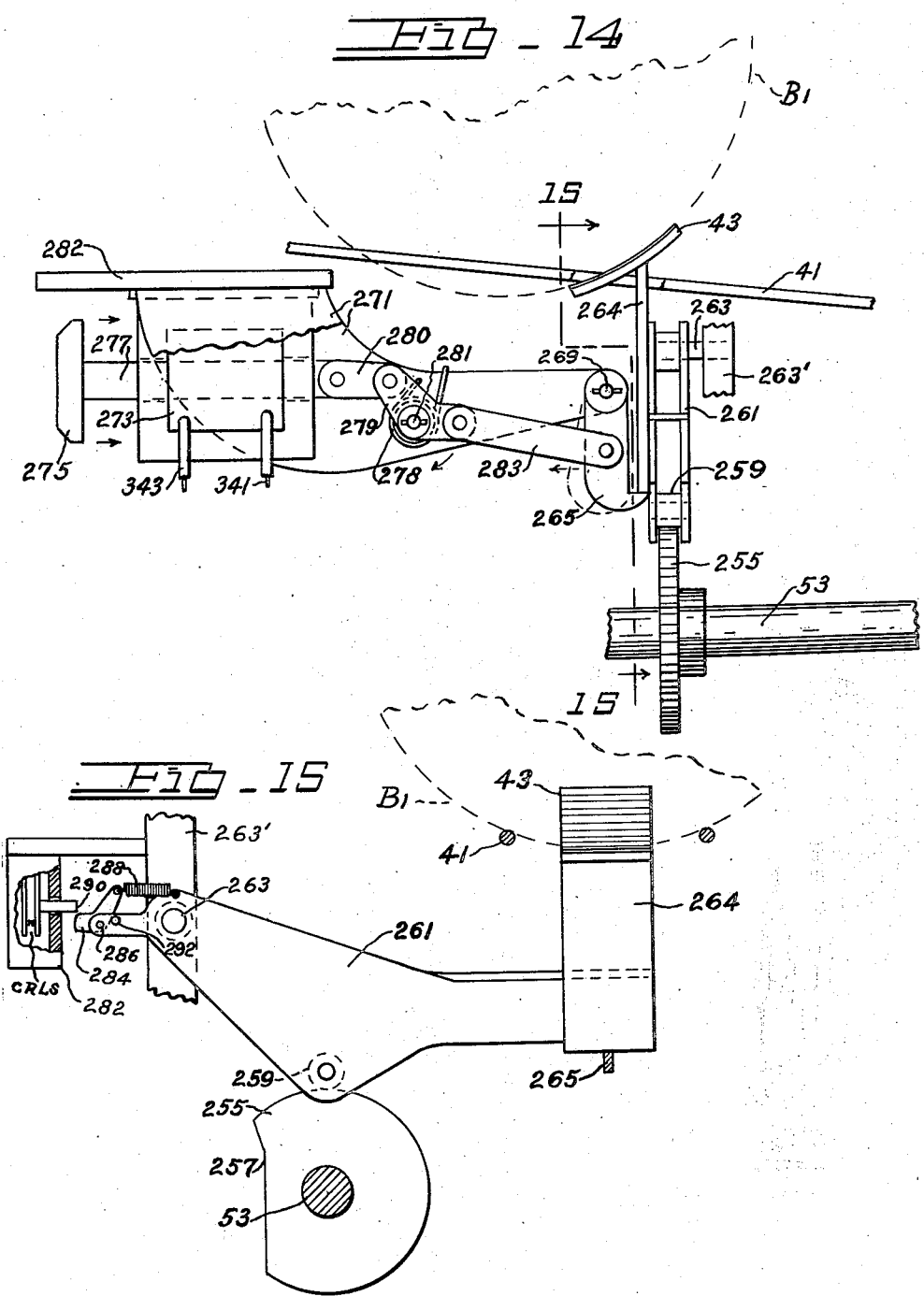

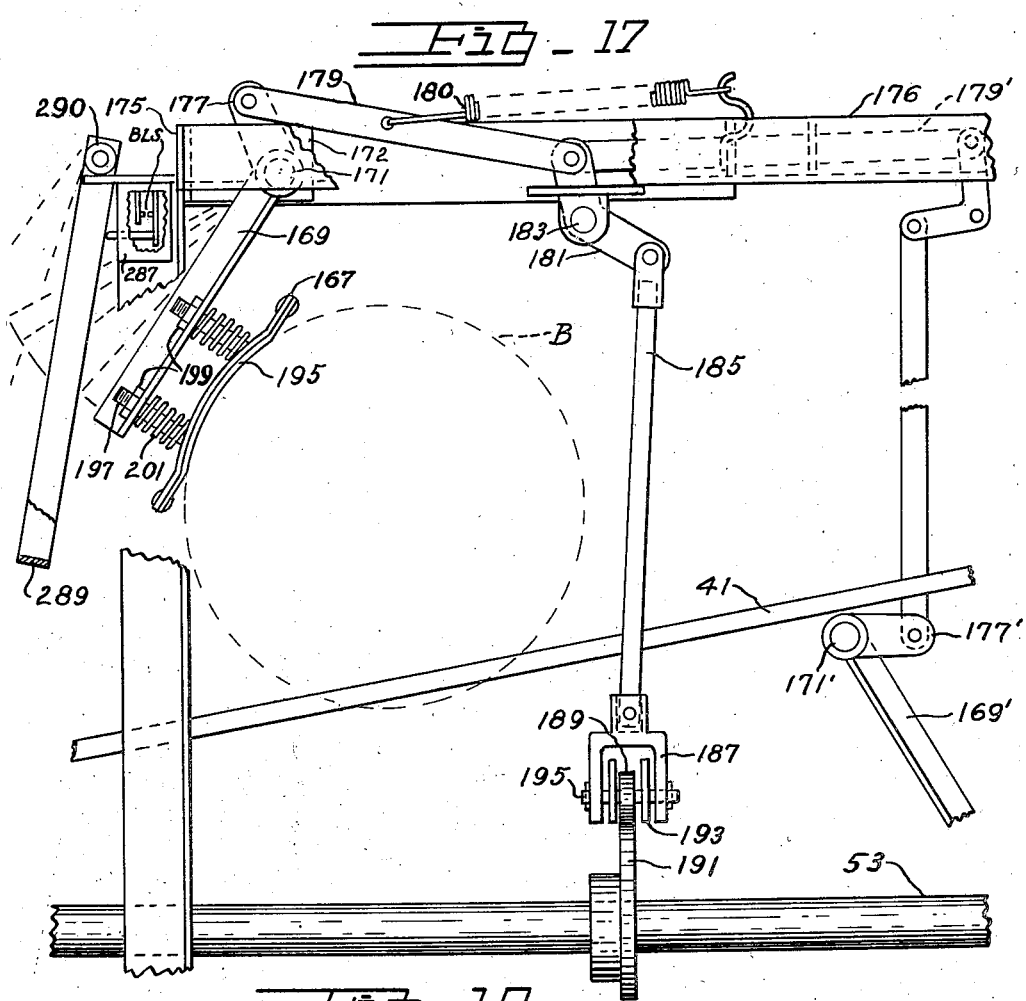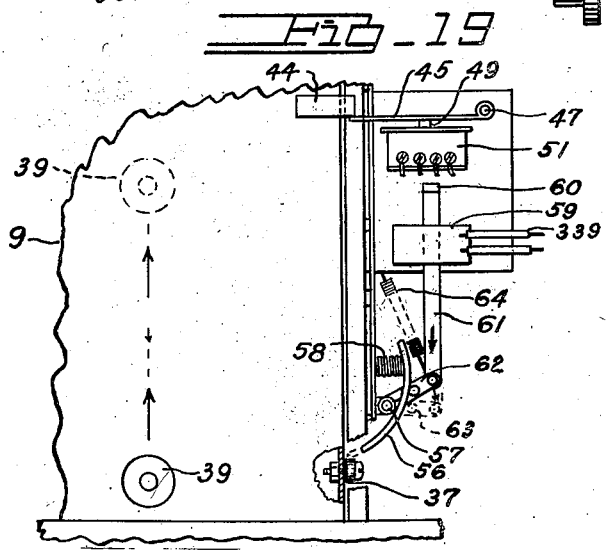

Dec. 2, 1952     G. W. HAYES ET AL     2,619,662
AUTOMATIC COIN-CONTROLLED BALL-CLEANING
AND POLISHING APPARATUS
Filed Feb. 20, 1948     8 Sheets-Sheet 7
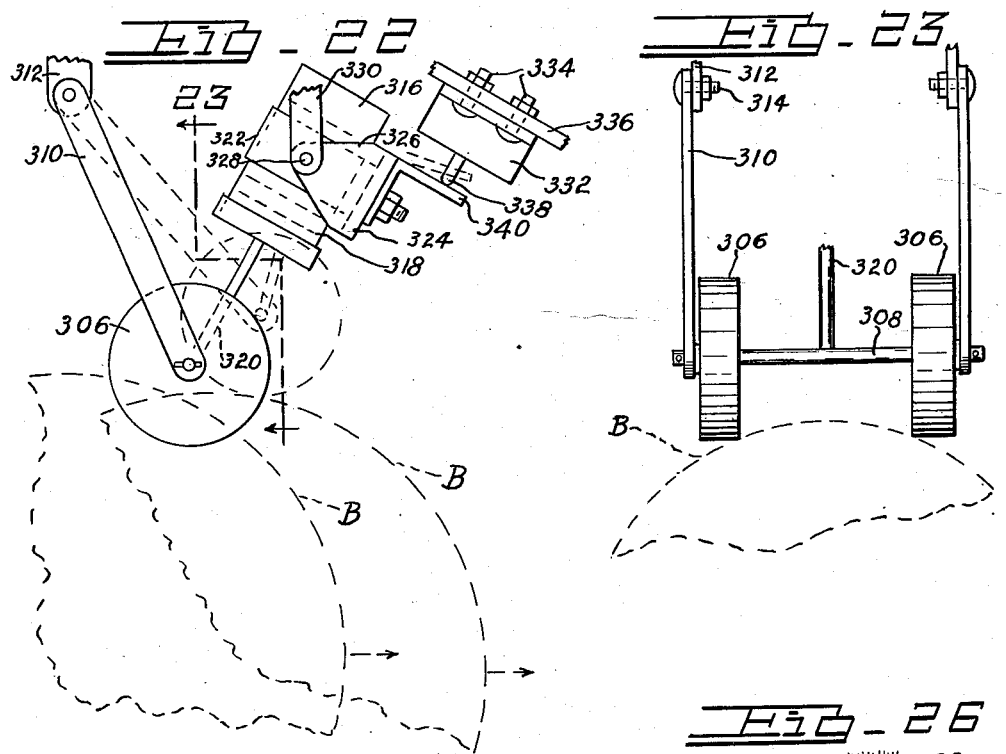
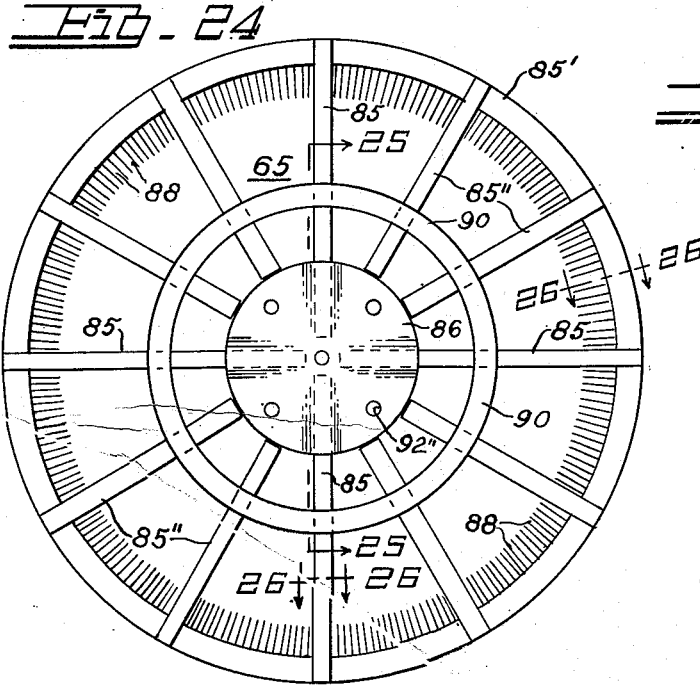
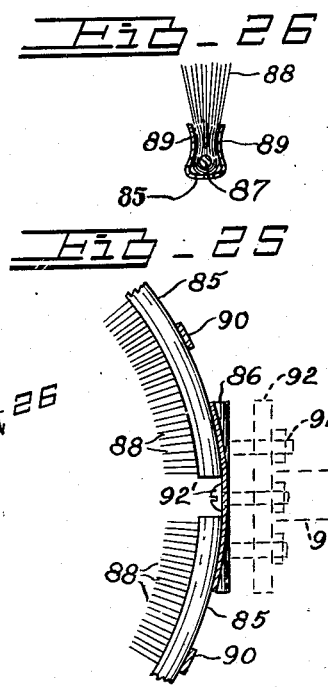
INVENTOR
GEORGE W. HAYES
OTTO SLOAN
BY J. J. Hicks
ATTORNEY Dec. 2, 1952   G. W. HAYES ET AL   2,619,662
AUTOMATIC COIN-CONTROLLED BALL-CLEANING
AND POLISHING APPARATUS
Filed Feb. 20, 1948   8 Sheets-Sheet 8
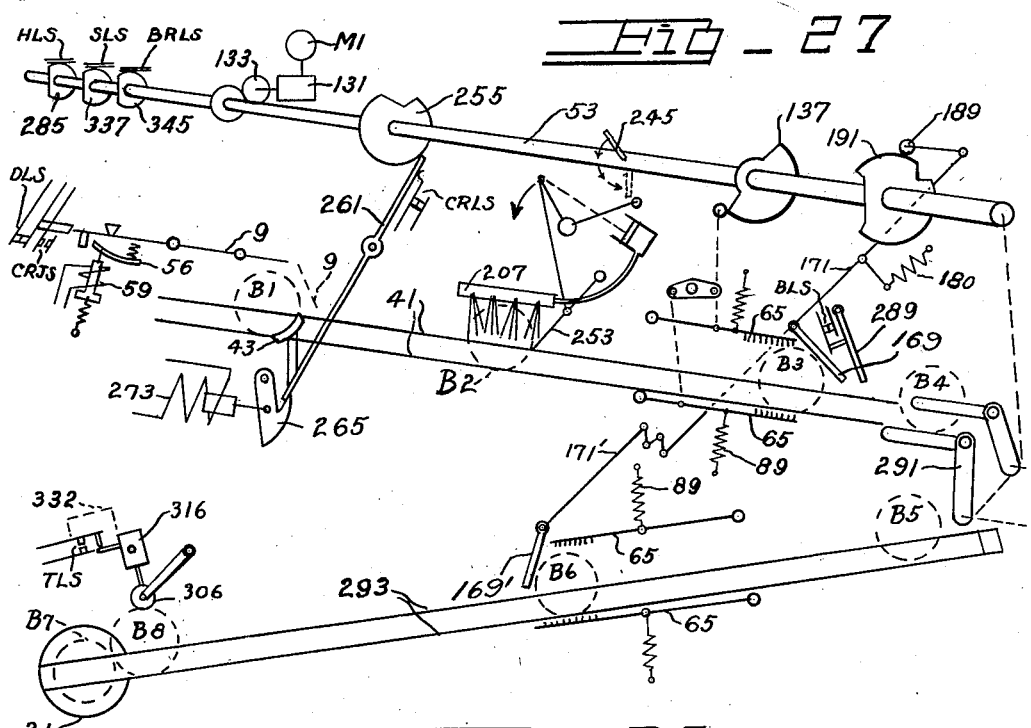
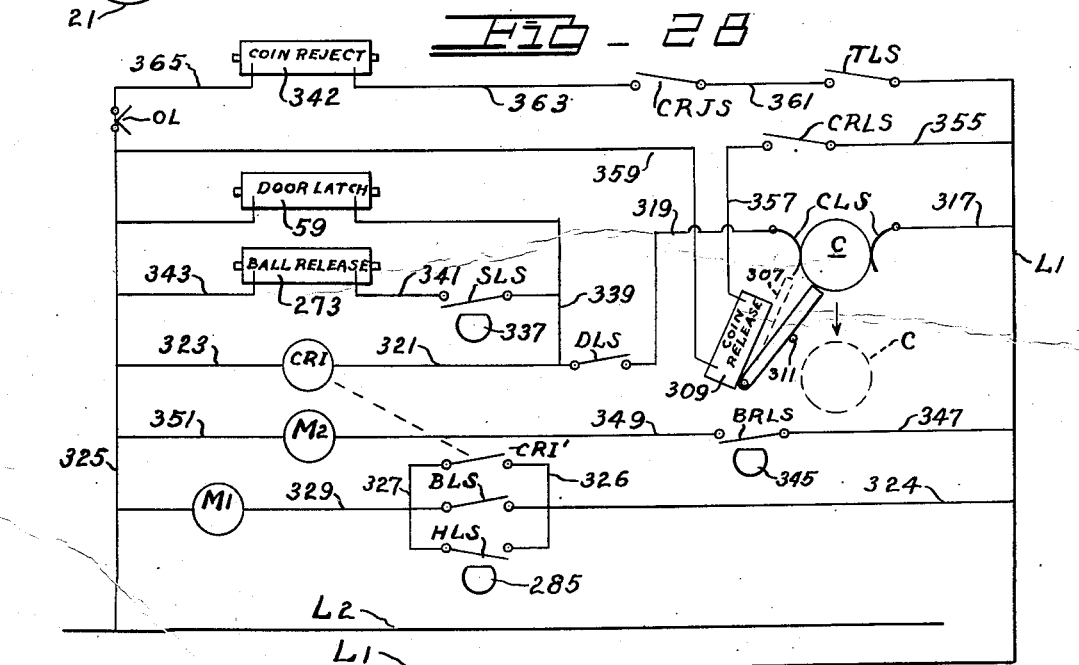
INVENTOR
GEORGE W. HAYES
OTTO SLOAN
BY F. T. Hicks
ATTORNEY Patented Dec. 2, 1952

2,619,662

UNITED STATES PATENT OFFICE 2,619,662

AUTOMATIC COIN - CONTROLLED BALL CLEANING AND POLISHING APPARATUS

George W. Hayes and Otto Sloan, Wayne, Mich., assignors to Hayes Sloan Products Company, a corporation of Michigan Application February 20, 1948, Serial No. 9,865

15 Claims. (Cl. 15—21)

1

The invention pertains to apparatus for cleaning, polishing and processing balls or like spherical objects.

It is an object of the invention to provide improved apparatus for receiving bowling balls, and like spherical objects, and automatically performing thereon a series of cleaning, polishing and processing operations to cleanse and restore the outer surfaces of such inserted objects.

It is also an object of the invention to provide such an automatic ball cleaning and polishing apparatus which will operate with accuracy and precision to cleanse and polish the surfaces of inserted balls without marring the finish thereof.

It is a further object of the invention to provide such a ball cleaning and polishing machine having improved ball guiding and control means for moving the ball through the machine and for excluding the possibility of a following ball moving into any operations in conflict with a previously inserted ball.

Another object of the invention is to provide in such a machine a ball stop for stopping the ball in a proper position between a pair of opposed brushes and for contacting the ball so as to establish a definite axis of rotation in the ball as it is being brushed.

A further object of the invention is to provide such a ball stop in such a machine with controls which release it momentarily to establish a different axis of rotation in the ball as it is being brushed, in order to thoroughly cleanse all of the surface of the ball.

Also it is an object of our invention to provide an improved ball cleaning or polishing brush. This brush is claimed in our copending divisional application Serial No. 111,682, filed August 11, 1949.

Still a further object of our invention is to provide a ball receiving and holding basket.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which:

Fig. 1 is a perspective view looking down upon the ball cleansing and polishing machine from the front right hand corner thereof;

Fig. 2 is an enlarged plan view of the machine, with external panels broken away or removed,

2 and with some structural members broken away to show the internal structure;

Fig. 3 is an elevational view showing the right hand side of the machine;

Fig. 4 is an enlarged fragmentary sectional view through a side of the cabinet showing how an external panel may be secured;

Fig. 5 is an enlarged sectional view through one corner of the cabinet;

Fig. 6 is a side elevational view showing the left hand or cam shaft side of the machine;

Figs. 7, 8, 9, 10, 11 and 12 are side elevational views of the cams carried by the cam shaft, and showing the contours thereof;

Fig. 13 is a view, partially diagrammatic, representing the oppositely swinging brush arms and actuating controls;

Fig. 14 is a fragmentary enlarged side elevational view showing the inlet ball stop of the entrance chamber with its controls;

Fig. 15 is a front elevational view of said inlet ball stop with controls, being actually a sectional view on line 15—15 in Fig. 14;

Fig. 16 is an enlarged view partly diagrammatic, showing the cleaning fluid spray system and controls;

Fig. 17 is a view, partially diagrammatic, showing the brush ball stop with its controls for changing the axis of rotation of the ball, and finally for releasing the ball;

Fig. 18 is a front elevational, partially diagrammatic, view of the ball transfer cranks in full line position for receiving the ball, shown dotted, and the cranks also being represented by dotted lines in a position for lowering the ball upon the elevated rear end of the second or bottom track;

Fig. 19 is an enlarged fragmentary plan view showing a portion of the entrance chamber door with control switch operated by closing the door, and the electromagnetic latch for holding the door shut while a ball is going through the machine;

Figs. 20 and 21 are respective plan and side elevational views showing how the externally projecting ends of the track rails are bent up and secured to a guard to form a basket for delivering and returning a polished ball;

Fig. 22 is a side elevational view showing the ball check device;

Fig. 23 is a sectional, fragmentary view, on line 23—23 in Fig. 22;

Fig. 24 is a rear elevational view showing one of the ball processing brushes;

Fig. 25 is a fragmentary sectional view on line 25—25 in Fig. 24;

Fig. 26 is an enlarged cross-sectional view of a bristle bearing element of the brush, taken on either line 26—26 in Fig. 24;

Fig. 27 is an operating diagram representing a ball, shown dotted, in various positions as it moves through the machine in cooperative relation to the various controls; and Fig. 28 is an electrical wiring diagram schematically showing one arrangement of electrical connections which is suitable for establishing coordinated control between the electrical and mechanical elements throughout the machine.

Referring more specifically to Fig. 1 of the drawings, it will be seen that our improved ball cleaning and polishing machine comprises an enclosure or cabinet 1 which may be supported above the floor on pedestals 3. The top wall 5 of the cabinet has an intake aperture of a circular shape just slightly larger than a bowling ball so that a ball (not shown) can be inserted by only one hand thereby assuring that the finger holes will be upward when a bowling ball to be cleaned is inserted into the cabinet. In a manner to be subsequently described in detail, a closure member or door 9 is movably mounted under the top wall, so that the intake aperture 7 will be closed to prevent the insertion of a second ball until the processing of the first ball has been sufficiently accomplished, as will be subsequently described.

The machine is preferably available for automatic operation by the public, and for this purpose is provided with a coin box and control 15, which may be any of a great many such conventional devices in common use on various vending and other machines. Such coin controls commonly have a coin receiving slot 17 for receiving coins of proper denomination, a coin return pocket 19 for returning coins to the depositor under certain conditions, and a locked coin door 20 from whence the collected coins may be removed by an authorized person.

The user merely deposits the proper coin in the coin slot 17, places his bowling ball into the intake aperture 7 in the top wall of the cabinet and pulls the door 9 shut. After a short time interval, the ball is delivered in thoroughly cleaned and polished condition into a delivery basket 21 in the delivery aperture 11 at the front of the machine. Another user may also similarly insert his bowling ball for thorough cleaning, polishing, reconditioning, and such operations may be repeated indefinitely, and so far as the public is concerned that is all there is to the machine and its use and operation is very simple and convenient, as suitable controls prevent improper operation by the user.

Fig. 2, a plan view substantially enlarged compared to Fig. 1, shows how the machine appears from above, with the top wall and some of the structural support members broken away, and with Fig. 4 this shows that the cabinet may comprise a well known structure having supports or cross-pieces 22 of a "hat shaped" cross section. These are substantially channel irons with the edges turned outwardly to provide oppositely projecting lateral flanges 23, whereupon the metal plates or sheets 5 may be snugly secured as by screws 27 passing threadably through the yoke of the cross-piece, for forming the enclosing walls of the cabinet. The corners of the cabinet are formed by corner members 29 which, as shown in Fig. 5 are quite similar to the cross-pieces 22 except that the lateral flanges 30 extend at right angles to each other, instead of lying in the same plane, and the edges of the side wall sheets 5 are bent to be clamped into these corner pieces by a corner strip 31 secured by screws 33 in the yoke of the corner member. Such cabinet structure is well known and is not a part of the present invention.

Top view Fig. 2, taken with the two side views Figs. 3 and 6, show the arrangement of the internal machine assembly comprising a ball entrance chamber 35 into which a ball may be inserted through the top opening of the cabinet. The rear end of the chamber is open, except that an entrance chamber door 9 is provided which resembles an overhead garage door in having a plurality of sections joined pivotally together and the edges guided by rollers 37 between tracks 38 so that the door may be moved down to close the open rear end of the chamber as shown, or the door may, by grasping a knob 39 thereon, be pulled up, as indicated by the arrows, toward the front of the cabinet to a closing position, represented dotted, to close the chamber intake opening 7. This also opens the rear end of the ball chamber to permit a ball to roll back on a track comprising a pair of guide rails 41, as soon as a chamber ball holding stop 43 is lowered for this purpose, in a manner to be subsequently described. Pulling the door up and to the front causes a projection 44, carried on the door, as may be more clearly seen in Fig. 19, to strike the free end of a lever 45, the other end of which is pivotally supported on a stationary pivot pin 47, and the intermediate portion of the lever presses the operator 49 of a conventional double pole single throw switch 51, operating two pairs of contacts, DLS closing and CRJS opening, as on Figs. 27 and 28. The contacts DLS being arranged in series with coin controlled contacts CLS, held temporarily closed, by coin, starts the motor M1 driving actuating means such as the operation controlling cam shaft 53, to be later described in detail. As this door reaches the closed position toward the front of the cabinet, one of the guide rollers 37 projecting from the door passes under the end of a latch 56, which then snaps into locking position and prevents reopening the ball intake port 7 to insert another ball. The latch 56 pivots on a pin 57 and is urged to latching position by a spring 58, but its movement to latching position is possible only when an electromagnet 59 is energized, (and this occurred at the same time by the projection 44 on the door operating the switch 51) pulling its armature 60 which pushes rod 61, as indicated by the arrow, swinging one end of a lever 62, which pivots freely on the same pin 57. Lever 62 carries a pin 63 in a clockwise movement away from the latch 56, as represented by dotted lines, and the latch is then swung by its compression spring 58 to move the other end into latching engagement behind guide roller 37, where it remains as long as the electromagnet remains energized. When a suitable stage has been reached in processing the ball, coin C drops, contacts CLS open and the electromagnet winding 59 is deenergized, in a manner to be described later, and then its armature 60 moves back again and also moves the lever carrying pin 63 against the latch which also is turned in a counter-clockwise direction, to its unlatched position, as shown in full lines. This movement of the armature and attached parts, after the electromagnet 59 has been deenergized, is accomplished by a spring 64 connected therewith in any suitable manner. The door 9 being now unlatched, moves by gravity, a spring or any suitable manner, to its open position in the ball entrance port while closing the back of the entrance chamber, as shown in full lines, in Figs. 2, 3 and 6.

For scrubbing the ball, a pair of cup shaped brushes 65 are provided rotatively mounted in bearings 67 on the swinging ends of upper brush arms 69 on opposite sides of the track and movable away therefrom, as indicated in Fig. 2 by the arrows and dotted lines. The frontwardly extended ends of these arms 69 are pivotally mounted on pivot pins 71 between bracket plates 73 suitably secured to and projecting from structure members 75 and 76 of the machine frame. Under each upper brush arm 69 a lower arm 77 also extends in spaced relation to the front of the machine where each is similarly mounted to swing pivotally on a pivot pin 71. The swinging ends of each corresponding pair of brush arms 69 and 77 are rigidly secured together through a connector 79, which may be welded or secured thereto in any suitable manner. Such brush arms 69 and 77 are preferably inclined angularly apart, as by spreading the front pivotally mounted ends apart, thereby providing a brush mounting bracket which is strong and rigid in all positions. A lower cup shaped brush 65 is also similarly mounted to rotate in the lower part of each swinging brush bracket, so there are also a pair of these brushes for embracing opposite sides of a ball on the lower guide track.

As shown in Figs. 24, 25 and 26, the cup shaped brushes 65 are made of bristle carrying elements or ribs 85 bent to an arcuate form and having one end of each secured to an end mounting disc 86, as by welding thereto. These bristle carrying ribs or elements are a well known product available on the market and each comprises bristles 88 secured by a locking wire 87 between sidewalls 89 which have been bent or crimped inwardly in a snug clamped relation thereon. Such bristle carrying elements or ribs 85 are selected and shaped by us so that the bristles 88 are directed inwardly in a suitable conformation to engage an embraced ball and to give it an effective scrubbing or processing. The other ends of these bristle carrying ribs 85 are secured, as by welding, to another bristle carrying element 85', which has been bent into a circular shape with its bristles 88 directed inwardly for engaging a ball. Intermediately, the ribs 85 are encircled on the outside by a reinforcing hoop 90, secured thereon as by welding. The end mounting disc 86 is preferably distorted slightly, as shown, for more intimate attachment with the ends of the arcuate shaped ribs 85 welded thereto. Additional bristle carrying ribs 85" may also be bent to similar arcuate shapes and disposed in spaced relations between the previously mentioned ribs 85, being secured to the circular member 85' and inside of the hoop 90, but not necessarily to the mounting disc. Brush carrying shafts 91 are provided with heads 92 of disc form similar to the mounting discs 86, shown dotted in Fig. 25, and these are readily assembled and secured together by bolts 92' passed through suitable apertures 92", as will be readily understood. The bristles 88 of these brushes are selected to produce suitable scrubbing, or abrasive, or polishing action, as desired. For example, the upper pair of brushes may be made suitable for removing lacquer and other foreign matter from the surface of a ball, while the bristles of the lower pair may be finer and softer for polishing. The cooperative pairs of brushes are so mounted on the swinging brush brackets as to embrace opposite sides of a ball passing therebetween on the guide tracks and to lift the ball slightly. The track rails 41 pass adjacent the lower portions of the cooperative brushes and at these positions the rails may be distorted closer together to avoid interference with the rotating brushes. The swinging brush brackets are spring biased to normally swing apart to the dotted line positions to hold the respective pairs of brushes opened apart, and this is conveniently accomplished by a pair of tension springs 89 stretched from these swinging brush brackets to the stationary side structure, as may be seen in Fig. 2.

From each rotative brush its shaft 91 projects through the bearing on the swinging brush bracket to receive a belt pulley 93 secured thereon, as may be seen in Fig. 2, for driving the brushes from an electric motor M2 mounted in a rear corner of the cabinet. As may be seen in Fig. 3, the motor M2 is mounted on brackets 97 with its projecting shaft downward and provided with a belt pulley 99 for driving a belt 100 which runs around a pulley 101 on the lower end of a vertical shaft 103 which is journalled in bearings 105 secured rigidly between channels 107. Pulleys 109 on the upper portions of this shaft drive belts 111 around pulleys 113 on vertical stud shafts 115, rotatively supported in bearings 117 which are substantially in axial alignment with the pivot pins 71 whereupon the brush brackets swing. Each such stud shaft 115 has secured thereon a pulley 119 and from these pulleys belts 121 are driven around the pulleys 93 of the four brushes for rotating all the brushes simultaneously. The belts and pulleys are preferably of the V-type, although other driving means may be used if desired, instead of belts.

The brush driving belts are twisted suitably to cause the two brushes of each pair to rotate in opposite directions. As the shafts 115 are in alignment with the pivot pins 71, the tension of the brush driving belts 121 is not disturbed by the swinging of the brush brackets to open the brushes apart or to close them together.

Figs. 2 and 6 show the cam shaft 53 which is rotatively supported at the rear end in a rear bearing plate 125, intermediately in a bearing 127, and adjacent the front end in bearing 129. The cam motor M1 drives the cam shaft 53 through a gear box 131 and gears 133 for slow speed operation, and the drive between the motor and the gear box may be a belt 135, although any other suitable power transmission means may be utilized, as will be understood.

The swinging of the brush arms to engage a ball on the tracks is actuated from the cam shaft 53, which has been started into operation by inserting a coin and closing the door, as previously mentioned. Fig. 7 more clearly shows the brush actuating cam 137, although it can also be seen in the side view of the machine Fig. 6. Fig. 13 shows the brush arm control means actuated from the cam shaft comprising a pull rod 139 which passes loosely through an aperture 141 in a cross-arm 142 of the remote brush bracket and having a compression spring 143 secured by a nut 144 for yieldingly drawing the brushes from the remote side of the machine to engage a ball on the track against the tension of spring 89 which continuously pulls the brush away from the track. The other end of the pull rod 139 connects pivotally into one end of a rocking lever 145 which is supported pivotally on a pivot pin 147 passing through an intermediate portion of the lever. The other end of the lever 145 is connected between the ends of a pair of link members 149 by a pivot pin 151 passing therethrough and the other end of these links are each connected pivotally and independently by pins 153 to upper ends of a pair of arms 155, the lower ends of which are suitably apertured to ride freely upon the cam shaft 53 with the cam 137 rotatable freely therebetween. A cam engagement roller 157 is rotatively supported on a pin 158 secured firmly in and extending between the spaced links 149, at a suitable position to be engaged when the land or high portion of the cam 137 rotates thereto. Thus, rotation of the cam in the direction indicated by the arrow in Fig. 13 eventually moves the pair of link members 149 to rotate the lever 145 and pull the rod 139, as represented by arrows, thereby pulling the brushes toward the tracks 41, to a position represented in full lines in Fig. 13. At other times the parts rest in the dotted line position wherein the roller 157 will be engaged by the cam 137 during its next rotation, as may be seen in Fig. 13.

The brushes and brackets on the opposite side of the machine are simultaneously moved in the opposite direction to engage the ball from the opposite side. This is accomplished by any suitable linkage transmission means, such as a pull rod 159 connected pivotally into the other end of the rocking lever 145 remote from the pull rod 139. The other end of the pull rod 159 passes loosely into an aperture in another cross-arm 142 in the other swinging brush bracket and applies pressure yieldingly thereto, as by a compression spring 143 backed up by a nut or other stop 144 on the rod.

The ball is stopped and held in a proper position and its motion controlled between the brushes by a brush ball stop 167, which may be seen in Figs. 2 and 3 but which is shown more clearly in Fig. 17 with associated controls. The brush ball stop 167 is supported on the lower end of a lever 169 which at its upper end is secured on a shaft 171 which is rotatively supported by brackets 172 on a suitable portion of the upper frame structure, such as the angle iron 175 disposed transversely over to side members of the machine frame structure between longitudinal angle irons 176. The ball stop 167 is supported by the shaft 171 so that it is depending rearwardly inclined over the tracks 41 in a position to engage the upper advancing surface of an approaching ball B, represented by dotted lines. One end of the shaft 171, adjacent one of the angle irons 176, has secured thereon a crank 177 the other end of which is pivotally connected to one end of a link 179, the other end of this link being pivotally connected to one arm of a bell crank 181 which is rotatively supported on a pivot pin 183 mounted in said angle iron frame member 176 at a forward position. The other arm of this bell crank 181 is pivotally connected with a connecting rod 185, the lower end of which has a fork 187 presenting a cam follower roller 189 on a cam 191 secured on and driven by the cam shaft 53. Links 193 extend pivotally from the axle 195 of the cam roller 189 to an adjacent portion of the frame structure to hold the roller in a cooperative position on the cam 191. A lifting spring 180 connects from the link 179.

Fig. 9 shows the contour of the cam 191, which has a cut out notch 193 for releasing the brush ball stop 167 momentarily, while still embraced by the two scrubbing brushes. It has been found that the ball will then rotate with one or the other of the two scrubbing brushes, as these brushes will never be exactly balanced in frictional grip on the ball. When the ball is held by the ball stop 167, it cannot rotate freely with either brush and the ball stop establishes an axis of rotation. Momentarily releasing the ball stop and then causing it to reengage the ball, establishes a new axis of rotation in the ball to more thoroughly clean all surfaces of the ball.

High friction is provided in the brush ball stop 167 to accentuate this effect by making it of a concave shape to snugly fit against the ball and by providing it with a layer 195 of material which is soft or yielding and has a high coefficient of friction on the ball. Leather has been found to be satisfactory for the purpose although other suitable materials may be utilized. The ball stop 167 is preferably supported on its lever 169 by pins 197 and having retaining nuts 199 on the projecting end with compression springs 201 disposed on the portions of the pins between the stop and the lever, so that the stop will yieldingly engage the ball.

The frictional ball stop and pivot 167 is released when the larger cut out area 203 of its cam 191 comes under the follower roller 189, and spring 180 lifts it so that the ball may continue to roll along the track, the scrubbing brushes having been separated. The shape of the cam 191 may be selected to divide the scrubbing time as desired, before and after shifting the axis of rotation of the ball, and proper relative timing of the cam (and for that matter all the cams) on the cam shaft is conveniently determined in accordance with the angular positions in which the cams are secured on the shaft, as by set screws 205, or keys or other securing means. Lower ball stop arm 169' is similarly controlled.

Dry scrubbing may adequately clean the balls and especially by selecting scrubbing brushes providing a desirable amount of abrasive action, which is a well known expedient in the manufacture and use of brushes, and the brushes may be made up of any desired number of bristle carrying elements.

If desired, the ball may be wetted with a cleansing or solvent fluid before it is scrubbed. This may be readily accomplished by mounting, as shown in Fig. 2, a spray nozzle head 207 at a point adjacent the path of the ball before it reaches the scrubbing position, as by securing it to the angle irons 176 which extend back from the entrance chamber. To supply the nozzle with the fluid, at the proper instant, as shown in Fig. 16, a small bore conduit 209 extends from the nozzle for connection with the cylinder 211 of a pump 213 mounted by a bracket 215 on the inside of a side wall 217 of a tank 219. This pump is mounted so that fluid may enter the cylinder intake port 221 near the bottom of the tank. A discharge port 223 delivers fluid under pressure from the cylinder into the conduit 209. In accordance with usual practice, any suitable check valve 225 prevents reverse flow of fluid from the pump to the tank, and a reversely disposed check valve 227 is disposed in series with the conduit 209. A piston 229, disposed in sealing relation in the cylinder, has a piston rod 231 passing slidably through a portion of the mounting bracket 215 with its extending end pivotally connected to a pump operator 233, which is bent so that its upper end curves over for pivotal connection by pin 234 with the upper end of one arm of a bell-crank 237 which is pivotally mounted on a stationary pivot 239. The other arm 241 of this bell-crank carries a roller 243 adjacent one side of the cam shaft to be engaged and pushed back by a cam shaft projection 245 as the cam shaft rotates. This projection 245 may be a pin threadably secured into the shaft. As the roller 243 is pushed away from the cam shaft, the pump operator 233 is lifted up and its upper end is also carried toward the cam shaft until the center or axis of its pivot pin 234 passes to a self-locking position over the center of the pivot 239 on which the bell-crank oscillates as shown in full lines. A strong compression spring 247 is concentrically disposed on the piston rod, its lower end resting upon a pin 249 passing through the rod and its upper end reacting against the under side of a portion of the bracket 215, so that it tends to push the piston down for discharging cleaning fluid through conduit 209. But this can only hold the pump operator more firmly locked in the above mentioned self-locking position.

To trip this spring loaded pump, a link 251 connects pivotally from the upper end of the operator, as from pin 234, and to an intermediate portion of a trigger 253 having one end pivotally mounted on a suitable part 253' of the stationary machine structure and the other end disposed in the path of a ball in the position designated as B2, and a portion thereof being shown dotted. When a passing ball engages and moves the free end of the trigger lever 253, the pump operator 233 is pulled away from the cam shaft 53 far enough that it passes over its self-locking position and the compressed pump spring 247 sharply depresses the piston and throws a spray of the cleaning fluid over the ball, as it passes the nozzle head 207.

To assure the passage of ample time after the ball has been inserted to allow starting up of the machine after closing the door 9, the ball stop 43 of the entrance chamber is lowered in response to a predetermined sequence of operations. This provides for the proper setting of the spring loaded pump, as well as the cams for the other operations.

As Figs. 14 and 15 show, this system for lowering the entrance ball stop 43 at the proper instant of time, is also actuated from the cam shaft 53 which is provided with a cam 255 secured to the shaft in proper timed relation, as by a set screw for example, as more clearly shown in Fig. 8. The cut out area 257 in the cam 255 serves to drop the follower roller 259, rotatively mounted in an intermediate part of a ball stop arm 261, at the instant when the ball is to be released from the entrance chamber. One end of this ball stop arm 261 is pivotally mounted on a fixed pivot pin 263 secured in the rigid frame structure member 263', and the other end of this arm tends to oscillate up and down to impart similar movements to the ball stop 43 through a column 264, secured together in any suitable manner, as by welding for example. A latch 265 is pivotally suspended from a pivot pin 269 between the ends of two rigid brackets 271 projecting down in spaced relation under a base 282 mounted on the end of the machine frame. The base 282 and its depending brackets 271 form an easily mounted unit. Latch 265 normally hangs in a position to hook under the oscillating end of the arm 261 and the lower end of column 264, to hold the ball stop up in the ball stopping position, and this latch is only pulled back when solenoid 273 is energized by insertion of a coin and closing the door 9, to be described, pulling up the armature 275. This pushes rod 277 and turns bell-crank 279 which rotates on a pivot pin 281 in the bracket 271. The bell-crank 279 then pulls on pivotally interconnected rod 283 to pull back the latch 265 thereby allowing the ball stop 43 to fall when the cut out area 257 of the cam 255 next comes under the follower roller 259. A coiled spring 278 is provided on the pivot to restore the bell-crank to its normal position, as shown, and the upper arm of the bell-crank is connected to the rod 277 through a link 280 for free movement. Then occur the successive operations of spraying or wetting the ball, scrubbing the ball, shifting its axis of rotation, rescrubbing the ball to thoroughly clean all its surfaces, and releasing the ball to roll toward the lower or rear end of the track, as previously described.

Also the return movement of the ball stop arm 261 is utilized to actuate a switch 282, as shown in Fig. 15. As lever 261 lowers the ball stop 43, the other end of this lever rises and carries a small bell-crank 284 on a pivot 286. A spring 288 attached to the upper arm allows the lower arm of the bell-crank to engage and pass yieldingly over the button 290 of switch 282, without operating it, so the switch contacts CRLS remain open. But when this end of the lever 261 moves down, the bell-crank 284 is pushed back against the spring into rigid engagement against a stop pin 292, and this causes the switch button to be depressed and closes the switch contacts CRLS.

The cam shaft 53 is now approaching one complete revoultion and its cam 285 is about to open the associated switch contacts HLS, shown also in Figs. 27 and 28, to stop the cam shaft motor M1. But this is prevented by ball actuated switch 287, see Fig. 17, having contacts BLS connected in shunt with contacts HLS, as may be seen in Fig. 28. The ball actuated switch 287 is mounted on any suitable frame member, such as angle iron 175, where it is normally held open by the weight of an arm 289 held by a hinge 290 connected from a higher position so that this arm normally rests down against the switch operator and holds the contacts open. This arm 289 is preferably of a U shape with its yoke disposed adjacent the path of the ball so that the ball momentarily moves the arm away from the switch operator and permits the switch contacts BLS to close. This occurs during the time when HLS are opened by the cam, after which contacts HLS again close. This continues the operation of the cam shaft motor M1 and continues the cam shaft on its second revolution.

The ball rolls from the rear end of the upper inclined track or guide rails 41 to a pair of cranks 291 which comprise a ball transfer mechanism for transferring the ball safely down to a set of lower guide tracks 293 which incline forwardly to cause the ball to roll to the front of the machine. The ball transfer cranks 291 are driven by gears 295 forming a gear train from the cam shaft 53 and operating the cranks in timed relation thereto. This driving connection is arranged to drive the cranks 291 in opposite directions and in such timed relation as to approach an upper position for receiving the ball B when it reaches the rear end of the upper guide tracks. As represented in Fig. 18 the ball B then rolls upon the cranks 291. As the cranks then containe to rotate they carry the ball downwardly, a position is soon reached, represented in dotted lines, where the ball B is deposited upon the rear ends of the lower guide tracks 293. The cranks 291 may be wrapped with tape, and one or more rubber buffer blocks 299 may be mounted in the machine suitably spaced to yieldingly limit rearward movement of balls. A guide plate 301 may be mounted at the rear of the machine above the cranks 291, the ends of this plate being bent forwardly and diverging outwardly. This forms guide wings 303 for assuring that a ball moving back from the diverging rear ends 304 of the guide rails 41, will pass suitably upon the cranks 291.

As the ball rolls on the lower guide track toward the front of the machine it passes between the lower pair of polishing brushes 65, which are similar to the scrubbing brushes previously described except for having finer and softer bristles for drying and/or polishing. These lower brushes are also carried together or apart by the same swinging brush brackets and are rotated in opposite directions by the same electric motor M2, as previously described. Also a similar ball stop arm 169' is correspondingly positioned for stopping and holding the ball between the lower pair of brushes 65 responsive to the same cam and controls whereby is accomplished the stoppage of the ball in a proper position, then momentarily releasing the ball to establish a different position of the ball for processing all its surface and then finally releasing the ball and separating the brushes, as previously described, to let the ball roll on down the guidetrack. As the ball approaches the front of the machine it runs under a ball check, which as represented in the diagram Fig. 27, and as shown in Figs. 22 and 23, comprises a pair of wheels 306 on the ends of an axle shaft 308 swinging pivotally in links 310 the upper ends of which are pivotally suspended from stationary lugs 312, as by pins or screws 314 disposed loosely therethrough. To further resist or retard the motion of the ball B, a cylinder 316 is provided having a piston 318 connected by a piston rod 320 secured, as by welding, to the center of said axle shaft 308. The cylinder is mounted, as by a clamp 322, in a bracket 324, having bearing lugs 326 on opposite sides of the cylinder, for pivotal support as by pins 328 passing into stationary bracket means 330, depending from any convenient part of the machine frame. As the wheels are deflected up by the ball and swing back to a position as represented by dotted lines, the piston driven into the cylinder acts as a buffer to check the speed of the ball, due to compressing air in the cylinder. Also small air escape vents may be provided in the upper end of the cylinder or the piston may merely be a loose fit, to provide further damping effect.

The ball check, as above described, serves to retard the speed of the delivered ball so that it is not ejected from the machine at an excessive speed. And it also serves to actuate a switch 332 which is secured, as by screws 334, to any stationary structural member 336, of the machine in such a position that its operator 338 projects suitably to be engaged by an arm 340 secured to the cylinder assembly. When the ball check is moved by a ball, as represented in Fig. 22 by dotted lines, the switch is operated by the arm 340, also moved to its dotted position.

This opens the contacts "TLS" of this switch as represented in Fig. 27 and as shown in the wiring diagram Fig. 28. When a single ball passes out of the machine this circuit is only opened momentarily, but if a number of balls collect in the machine, this circuit is held open permanently which deenergizes the coin reject solenoid 342 and causes any inserted coin to be rejected and returned to the coin return pocket 19, shown in Fig. 1, which is conventional in such coin control devices.

As shown in Figs. 20 and 21, a ball delivery basket 21 is formed by curving upwardly the projecting ends of the rails 293 of the lower ball track. These upturned rail ends are attached, as by welding, to a curved front guard rod 344. The ends of this guard 344 are turned back and welded to the sides of the track rails 293, as shown. This provides a rigid ball protecting basket which is a part of the machine as a unit, and it does not have to be attached to the cabinet.

A housing 367 is provided enclosing the switch operating cams 285, 337 and 345 on the front end of the cam shaft 53. Contacts OL are a part of a usual overload switch and will be opened responsive to high temperature of a motor. Contacts OL, TLS and CRJS, all being in series in the energizing circuit from L1, contacts TLS, conductor 361, contacts CRJS, conductor 363, coin reject solenoid 342, conductor 365, contacts OL, conductor 325 to the other line conductor L2, will cause any inserted coin to be returned, so long as any of these contacts are open. This avoids restarting of the machine so long as any of the conditions prevail which opened any of such contacts.

*Operation-electrical circuits and contacts*

The mechanised operations, as previously described, occur in properly timed sequence because of providing a proper angular setting of the control cams on the cam shaft relative to each other and relative to the geared ball transfer cranks, as will be readily understood. The electrical elements have also been mentioned but to make clearer the cooperative coordination of the electrical and mechanical elements of the machine in its control systems, the operating sequence chart Fig. 27 is provided along with the wiring diagram Fig. 28, adjacently disposed on the same sheet for convenience.

Operations may be traced as follows:

(1) Placing the ball in the entrance chamber on the upper end of the first guide track at position B1, Fig. 27, it is held from rolling down by the ball stop 43 held up by latch 265 releasable by energizing a solenoid 273, after which the dropping of the ball stop 43 is controlled by the cam 255 through the lever arm 261.

(2) Depositing a coin C in the coin slot 17 closes an electrical connection between contacts CLS and the coin is supported by the upper end of an armature 307 of a deenergized electromagnet 309, held by a back stop pin 311. The coin being held in this position maintains electrical connection between electrical contacts of the "coin limit switch CLS."

(3) Closing door 9 of the cabinet actuates a switch 51, as previously described, to close contacts DLS and open CRJS. Door latch 56 holds door shut and is releasable only when a solenoid 59 has been deenergized.

(4) Cam shaft motor starter electromagnet CRI is energized closing starter switch CRI' and starting the cam shaft motor M1.

The circuit for starter electromagnet CRI is from L1 through conductor 317, coin contacts CLS, conductor 319, door contacts DLS, conductor 321, starter CRI', conductors 323 and 325 returning to the outer main line conductor L2, as may be seen in Fig. 28.

The circuit for the cam motor M1 may be traced from line conductor L1, conductors 324 and 326, through starter contacts CR1', conductors 327 and 329, cam motor M1, and by conductor 325 to the other line conductor L2.

Events (1), (2) and (3) may be performed in any sequence and the cam motor M1 will be started when all have been performed, as is apparent from Fig. 28.

(5) Operation of the cam motor M1 drives the various cams, which may be seen individually in Figs. 7 through 12. Cam 337, see also Fig. 28, closes contacts SLS to energize solenoid 273 which pulls the latch from under ball stop 43, so when its cam 255 has turned this will release the ball from the entrance chamber and start it rolling down the track. The circuit for solenoid 273 may be traced from conductor 321 by way of conductor 339 (DLS and CLS being still closed) through SLS, conductor 341, through solenoid winding 273, then by conductors 343 and 325 to the other main conductor L2. As Fig. 15 shows, movement of arm 261 to release ball, closes contacts CRLS on the return movement. This drops coin C deenergizing door solenoid 59, which unlatches the door 9 and another ball may be inserted, by the time the ball stop is returned. If the door 9 remains closed because it is not manually opened, the cam shaft motor M1 continues to operate the cam shaft 53 one more revolution because contacts BLS are closed by the previously inserted ball reaching position B3, Fig. 27, at the time when the holding contacts HLS are opened by cam 285. When this additional revolution of shaft 53 is completed, switch HLS is opened by cam 285 thereby stopping the cam shaft motor M1. But for a better understanding of the sequence of such operations note the operation designated as "(15)," below.

(6) If a cleaning solution is to be utilized, the ball now trips the trigger 253 which releases the spring loaded pump and is wetted with a cleaning fluid. By the time the ball reaches the spray position, the finger holes of the ball will have been turned down.

(7) A ball stop and pivot 167 stops the ball on the tracks at a proper position.

(8) A cam 345 closes contacts BRLS starting the brush driving motor M2, to rotate all the brushes. The circuit is from line conductor L1, through conductor 347, contacts BRLS, conductor 349, motor M2, and conductors 351 and 325 to other line L2.

(9) Coin release electromagnet 309 is energized and drops the coin. This is accomplished by the closing operation of contacts CRLS of a switch 282 positioned to be actuated by ball release arm 261 returning to its position. This circuit may be traced from L1 through conductor 355, contacts CRLS, conductor 357, winding of electromagnet 309, conductor 359, and then by way of conductor 325 to line conductor L2.

(10) The two rotating scrubbing brushes 65 are closed in embracing relation on opposite sides of the ball by operation from a cam 137, as previously described.

(11) Cam 191 releases the ball stop and pivot 167 momentarily and then again holds it on the ball to permit the ball to shift to a new axis of rotation for thoroughly scrubbing all surfaces of the ball, as previously described.

(12) Cam 345 opens its contacts BRLS and stops the brush rotating motor M2.

(13) Cam 137 permits the scrubbing brushes to swing apart.

(14) Cam 191 releases the ball stop 167 and permits ball to continue rolling down the track.

(15) Ball moves the arm 289 permitting contacts BLS to close during the time the holding contacts HLS are opened by the cam 285 and this continues the operation of the cam shaft for a second revolution.

(16) Ball at position B4 passes to ball transfer cranks 291, these being timed to be in an upper ball receiving position, and the ball is lowered and transfered to the rear end of the lower track, at position B5.

(17) Operations the same as (7), (8), (9), (10), (11), (12), (13) and (14) are now repeated on the lower track except that the bristles of the lower brushes are finer and softer for drying and/or polishing.

(18) The ball at B7 in rolling to the front delivery basket 21 engages the wheels 306 of the ball check device and opens contacts TLS momentarily.

(19) The cleaned and polished ball is disposed conveniently in the front delivery basket.

(20) If a second ball B8 comes toward the delivery basket and under the ball check before the other ball has been removed from the delivery basket, it remains under the ball check wheels 306, and contacts TLS are held open. Any inserted coin is then returned into the coin return pocket preventing anyone starting another ball through the machine until the ball B7 has been removed from the delivery basket 21, and this does not interfere with completion of balls already in the machine.

While the motors M1 and M2 may be provided with conventional starter equipment this may be omitted as it is common to start small motors by throwing them directly upon the line, as will be understood. It is apparent that within the scope of our invention modifications and different arrangements may be made other than herein disclosed, and the present disclosure is illustrative merely, the invention comprehending variations thereof.

What is claimed as the invention is:

1. In a bowling ball washing machine the combination of, a first section of guide track, means supporting said first section in a position inclined relative to the horizontal so that a bowling ball placed on the high end will by gravity roll down toward the low end, a second section of guide track, means supporting said second section of guide track in a position relative to the horizontal and oppositely to the inclination of the first section with the high end of the second section in a spaced relation under the low end of the first section so that a bowling ball placed on the guide tracks will roll in the opposite directions on the two sections of track, ball transfer mechanism disposed adjacent the low end of said first section of track for receiving a ball therefrom and operative for lowering the ball gently to the high end of the second section of track, a sprayer, means mounting adjacent to and directed toward said first section of track, a scrubber adjacent said first section of track at a lower level than the sprayer, a dryer adjacent the second section of track, actuating means, controls connected to said actuating means and operative for successively operating said sprayer, scrubber and dryer to wet, scrub and dry a ball as it progresses through various positions along the guide tracks, and an enclosure housing presenting a ball receiving aperture in an upper wall adjacent the upper end of the first section of guide track for receiving a bowling ball thereon and a ball discharging aperture in another wall at a lower level for discharging the bowling ball from low end of the second section of guide track.

2. A bowling ball washing machine in accordance with claim 1 and further characterized by the sprayer being suitably positioned along said first section of guide track and spaced from the ball receiving aperture of the housing at a distance so related to the diameter of the ball that when the ball has been inserted with the finger holes in a predetermined position the finger holes in the bowling ball are turned down by the time the ball reaches the sprayer.

3. A ball washing machine in accordance with claim 1 and further characterized by said ball transfer mechanism comprising two cranks rotating on parallel axes of rotation in a relation so synchronized that both cranks reach the outermost spaced positions of their orbits at the same times and both reach the innermost adjacent positions at the same times, the throw or radii of said cranks and the relative positions being such that in the innermost positions the space between them is less than the diameter of a bowling ball so that a ball may pass to the cranks from the lower end of the first section of guide track and the space between the cranks when approaching the outermost positions being greater than the diameter of a bowling ball so that a ball on the cranks will then be deposited upon the upper end of the second section of guide track, and means operatively connecting said cranks to said actuating means to be operated in a properly timed relation to the progress of the ball along the first or upper section of track for receiving the ball when the corresponding operations along this section of track have been completed.

4. A ball washing machine in accordance with claim 1 and further characterized by said scrubber and said dryer each comprising a pair of rotary brushes of suitable size and shape for embracing opposite sides of a ball to be cleaned, a pair of movable supports each rotatively carrying one of said brushes so that the rotary brushes may be moved to or from engaging relation with opposite sides of a ball on said guide, means for rotating said brushes in opposite directions, a frictional ball pivot stop, means movably mounting said stop adjacent the ball guide for engaging the ball when it arrives at a point between the brushes for stopping the ball in a proper position for brushing and for contacting the ball as it is being brushed to establish a definite axis of rotation in the ball, and said controls also operating said frictional ball pivot stop to engage and release the ball and perform the successive operations thereto.

5. A bowling ball processing machine comprising, a machine frame structure, a ball guide mounted thereon and inclined relative to a horizontal plane for holding a ball to be cleaned and to be moved along by gravity, a pair of substantially cup-shaped rotary brushes of suitable size and shape for embracing opposite sides of a ball to be cleaned, a pair of supports each rotatively carrying one of said brushes, means mounting said supports movably on said frame structure and disposed so that the rotary brushes may be moved to or from engaging relation with opposite sides of a ball on said guide, means operatively connected to said brushes for rotating said brushes in opposite directions, a frictional ball pivot stop, means on said frame structure movably mounting said ball pivot stop at a position adjacent the ball guide to engage the ball as it arrives at a point between the brushes for stopping the ball in a proper position for brushing and also for contacting the ball as it is being brushed to establish a definite axis of rotation in the ball, actuating means and control means connecting from said actuating means to said frictional ball pivot stop for momentarily releasing the pressure of said ball pivot stop from the ball and thereafter restoring its pressure on the ball so that the ball may momentarily move with one of the brushes and then have a new axis of rotation established in the ball in order to more thoroughly cleanse all surfaces of the ball.

6. A ball processing machine in accordance with claim 5 and further characterized by said frictional ball pivot being provided with a layer of material having a high coefficient of friction.

7. In combination in a ball washing machine, a ball guide for conveying a ball to be washed, spray projecting means, means mounting said spray means directed toward said ball guide for spraying a ball with cleaning fluid as it moves along said guide, a spring loaded pump connected with said spray projecting means, means for setting said spring loaded pump with the spring compressed, a latch for holding the pump in spring compressed condition, a latch releasing trigger disposed adjacent said guide at a position to be contacted and tripped by a ball moving on the guide for releasing the spring loaded pump and projecting a spray upon the ball as it passes along, and scrubbing brush means disposed adjacent said ball guide at a position for scrubbing the ball after it has passed said spray projecting means.

8. A ball washing machine in accordance with claim 7 and further characterized by said brush means comprising, a pair of substantially cup-shaped rotary brushes of suitable size and shape for embracing opposite sides of a ball to be cleaned, a pair of supports each rotatively carrying one of said brushes, means mounting said supports movably so that the rotary brushes may be moved to or from engaging relation with opposite sides of a ball on said guide, means for rotating said brushes in opposite directions, a frictional ball pivot stop, and means movably mounting said ball pivot stop at a position adjacent the ball guide for engaging the ball as it arrives at a point between the brushes for stopping the ball in a proper position for brushing and also for contacting the ball as it is being brushed to establish a definite axis of rotation in the ball.

9. A ball washing machine comprising, a ball guide inclined relative to the horizontal plane for supporting a ball, and advancing it by gravity to be cleaned, ball wetting means mounted adjacent said guide for wetting balls moving thereon, a pair of rotary brushes of size and shape suitable for embracing opposite sides of a ball after it has passed the wetting means, a pair of supports each rotatively carrying one of said brushes, means mounting said supports movably so that the rotary brushes may be moved to or from engaging relation with opposite sides of a ball on said ball guide, means for rotating said brushes in opposite directions, a frictional ball pivot stop, means movably mounting said ball stop adjacent said ball guide for contacting the ball when it arrives at a point between the brushes to stop the ball and also hold it as it is being brushed to establish a definite axis of rotation of the ball, actuating means, means operatively connecting from said actuating means for causing said movable supports to carry the rotating brushes into engagement with a ball, and means operatively connecting said actuating means for momentarily releasing the frictional ball pivot and thereafter restoring its pressure on the ball so that the ball may momentarily move with one of the brushes and then have a new axis of rotation established in the ball in order to more thoroughly cleanse all surfaces of the ball.

10. A ball cleaning machine comprising, a ball guide inclined relative to the horizontal plane for supporting a ball to be cleaned and advancing it by gravity, a pair of rotary brushes of size and shape suitable for embracing opposite sides of a ball, a pair of brush supports each rotatively carrying one of said brushes, means movably mounting said brush supports so that the rotary brushes may be moved to or from engaging relation with opposite sides of a ball on said ball guide, means for rotating said brushes in opposite directions, a frictional ball pivot stop, movable pivot stop support means disposed for contacting the pivot stop on the ball to stop the ball between the brushes and to hold it as it is being brushed so as to establish a definite axis of rotation of the ball, a cam shaft, an electric motor, a speed reducing power transmission for driving said shaft from said motor, means for initiating the operation of said motor, means for stopping said motor after a predetermined rotation of the cam shaft, brush control means actuated by said cam shaft during said predetermined rotation for successively causing the movable supports to carry the rotating brushes into engagement with a ball, control means operating from said cam shaft for momentarily releasing the frictional ball pivot stop and thereafter restoring its pressure on the ball, while the ball is being scrubbed, so that the ball may momentarily move with one of the brushes and then have a new axis of rotation established in the ball in order to more thoroughly cleanse all the surface of the ball, and said control means being operative from said cam shaft for releasing said brushes and said ball stop after a predetermined time interval to permit the ball to move along said guide.

11. A ball cleaning machine in accordance with claim 10 and further characterized by having a second ball guide disposed under the first ball guide and inclined relative to a horizontal plane in the opposite direction so that a ball thereon rolls oppositely to a ball on the first ball guide, a second pair of rotary brushes, means movably mounting said second pair of brushes operative adjacent said second ball guide for brushing a ball thereon similarly to the brushes adjacent the first guide, ball transfer mechanism adjacent the lower end of said first ball guide for receiving a ball therefrom and lowering it gently to the higher end of the second ball guide, and means operating said ball transfer mechanism from said cam shaft in proper timed relation to receive and transfer the ball to the second guide after it has been released from between the first pair of brushes.

12. In a bowling ball washing apparatus the combination of, a ball guide inclined relative to a horizontal plane and disposed for receiving a bowling ball on the upper end and guiding its path of travel as it rolls toward the lower end thereof, wetting means disposed adjacent the guide for wetting a ball as it moves along said guide, said wetting means being disposed at a point so positioned along the inclined guide that a bowling ball placed on the upper end thereof with its fingerholes upward will have the fingerholes turned downward when the ball has rolled to the position on the guide where it is to be wet, and scrubbing means disposed adjacent a lower part of the guide for scrubbing the ball after it has been wetted.

13. Bowling ball washing apparatus in accordance with claim 12 and further characterized by having enclosure means defining a ball entrance aperture adjacent the upper end of the inclined guide and of a size only slightly larger than a bowling ball so that such a ball can only be placed thereon by holding it in one hand and lowering it through the aperture thus assuring that the ball will start on the inclined guide with the fingerholes upward.

14. In a ball cleaning machine the combination of, a housing having a ball entrance and a ball outlet, ball guide means in said housing for receiving a ball inserted through said entrance and moving it around a predetermined path in the housing and finally delivering the ball at said outlet, ball processing means disposed in said housing cooperatively to said ball guide means for processing a ball as it is moved around said predetermined path in the housing, a closure, means movably mounting said closure for manually closing said entrance, closure latching means mounted movably adjacent said closure for holding said closure shut to restrict the insertion of additional balls into the housing after a ball has been inserted therein, electrical contacts actuated by insertion of a coin, closure contacts actuated by moving said closure to shut position, electromagnetic means for actuating said latching means, electromotive means for operating said ball processing means, electrical conductors connecting said electromagnetic means and said electromotive means to be responsive to the actuation of said contacts for operating the ball processing means and holding said closure latched until a predetermined portion of the ball processing has been completed, a coin reject solenoid, coin reject contacts positioned to be engaged and actuated by said closure when it is in shut position and electrical conductor means connecting said coin reject contacts to control said solenoid for rejecting any coin inserted while the closure remains in shut position.

15. A ball processing machine in accordance with claim 14 and further characterized by having a delivery basket positioned for receiving a ball from side ball guide means at said outlet, second coin reject contacts disposed prior to said basket to be engaged and actuated by an outgoing ball stopped by a previously delivered ball in said basket, and electrical conductor means connecting said second coin reject contacts to deenergize the coin reject solenoid and cause it to reject any coin inserted while said previously delivered ball remains in said basket.

GEORGE W. HAYES.
OTTO SLOAN.

(References on following page)

References Cited

The following references are of record in the file of this patent:

UNITED STATES PATENTS

| Number | Name | Date |
|---|---|---|
| 880,696 | Schupinsky | Mar. 3, 1908 |
| 956,426 | Rowland et al. | Apr. 26, 1910 |
| 1,021,788 | Mutter | Apr. 2, 1912 |
| 1,793,658 | Wilson | Feb. 24, 1931 |
| 1,798,322 | Floyd et al. | Mar. 31, 1931 |
| 1,876,851 | Burg | Sept. 13, 1932 |
| 1,920,064 | Cogsdill | July 25, 1933 |
| 1,921,680 | Kopnicky | Aug. 8, 1933 |
| 1,934,249 | Wynne et al. | Nov. 7, 1933 |
| 1,974,185 | Heisser | Sept. 18, 1934 |
| 2,016,110 | Heisser | Oct. 1, 1935 |
| 2,217,256 | McCauley | Oct. 8, 1940 |
| 2,281,852 | Messler | May 5, 1942 |
| 2,290,275 | Childers | July 21, 1942 |
| 2,306,955 | Karbusky | Dec. 29, 1942 |
| 2,321,162 | Sohm | June 8, 1943 |
| 2,351,432 | Jennings, et al. | June 13, 1944 |
| 2,380,172 | Harber | July 10, 1945 |
| 2,385,039 | Steinmetz | Sept. 18, 1945 |
| 2,395,511 | Simpson | Feb. 26, 1946 |
| 2,453,280 | Stewart | Nov. 9, 1948 |
| 2,454,090 | Reading | Nov. 16, 1948 |